United States Patent [19]
Clark et al.

[11] 3,922,064
[45] Nov. 25, 1975

[54] SELF-ALIGNING OPTICAL WAVEGUIDE CONNECTOR

[75] Inventors: Kenneth M. Clark, Beaumont; Marc W. Malsby, Lake Arrowhead, both of Calif.

[73] Assignee: The Deutsch Company Electronic Components Division, Banning, Calif.

[22] Filed: Nov. 11, 1974

[21] Appl. No.: 522,893

[52] U.S. Cl. ................................................ 350/96 C
[51] Int. Cl.² ............................................. G02B 5/14
[58] Field of Search ............ 350/96 C, 96 B, 96 WG; 250/227

[56] References Cited
UNITED STATES PATENTS

| | | | |
|---|---|---|---|
| 3,655,275 | 4/1972 | Seagraves | 350/96 B |
| 3,790,791 | 2/1974 | Anderson | 350/96 C |
| 3,846,010 | 11/1974 | Love et al. | 350/96 C |

*Primary Examiner*—Davis L. Willis
*Attorney, Agent, or Firm*—Gausewitz, Carr & Rothenberg

[57] ABSTRACT

The waveguide connector includes two units releasably joined together, each of the units carrying a support member for one or more optical waveguides with the waveguides being positioned with their ends in adjacency, the waveguide supports including complementary tapering surfaces of revolution which are resiliently biased together and accomplish automatic axial alignment of the waveguides.

11 Claims, 9 Drawing Figures

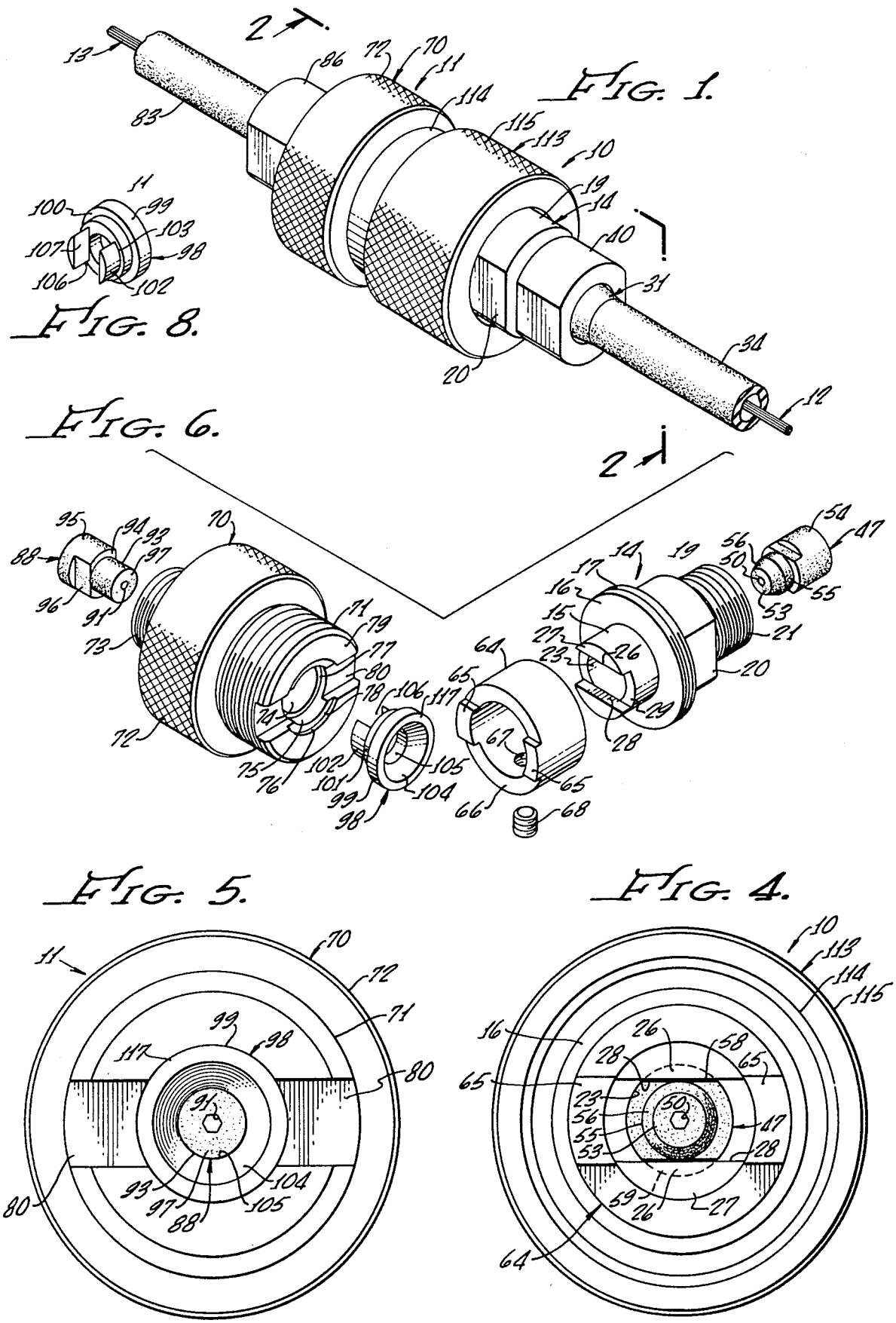

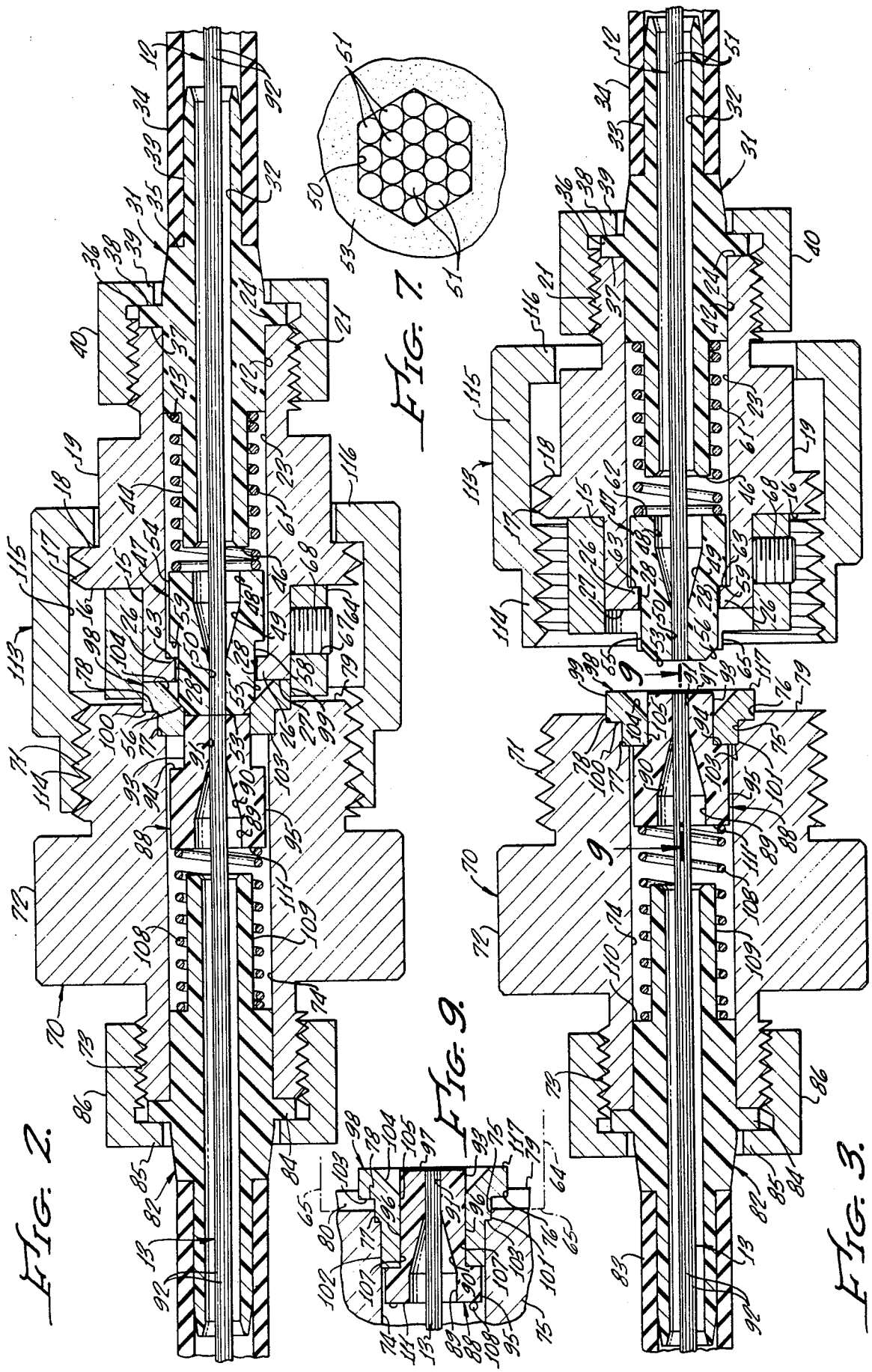

3,922,064

SELF-ALIGNING OPTICAL WAVEGUIDE CONNECTOR

BACKGROUND OF THE INVENTION

1. Field of the Invention

This invention pertains to a connector for optical waveguides.

2. Description of Prior Art

In connecting together optical waveguides for transmission of light signals, minimum attenuation of the signal requires precise end-to-end alignment of the individual waveguide filaments that are connected. Even minor misalignment can result in a loss of signal so pronounced that the connector has no practical utility. In the past, efforts at achieving alignment have involved attempts to provide interengaging means in the two connector sections to rigidly position the connected waveguides with their ends abutting. In such connectors, manufacturing tolerances can build up to the point that they result in such misalignment of the waveguides that there is severe signal attenuation. In the design of patent application Ser. No. 452,837, bundles of optical waveguides are connected in an end-to-end relationship with a means provided for achieving rotation of one bundle relative to the other. This assists in positioning the waveguides in alignment and in compensating for eccentricity in the two connector units. However, although a substantial improvement, this connector achieves adjustment only through rotational movement which limits the degree of alignment that can be accomplished.

SUMMARY OF THE INVENTION

The present invention provides a waveguide connector which automatically achieves waveguide alignment by means of interengaging surfaces that provide a centering action as the connector sections are mated. In each connector section one or more waveguides are supported in a ferrule, the two ferrules having identical openings receiving and positioning the ends of the waveguides. One of the ferrules is received within an opening in a disc that is attached to the shell of the connector section, the opening in the disc accurately positioning the ferrule and holding it against radial movement while permitting axial sliding movement. This ferrule is biased toward an outer position by means of a compression spring behind it. The disc, immediately outwardly of the ferrule, includes a concave frustoconical surface. The ferrule in the other connector section is received within a clearance opening in the shell of that section so that it is allowed limited lateral floating movement. This ferrule has a convex frustoconical surface adjacent its forward end. A compression spring, stronger than that of the other connector section, biases this ferrule outwardly.

When the two connector sections are secured together, the ends of the ferrules bear against each other, which pushes the first ferrule inwardly relative to the disc that receives it. This brings the convex frustoconical surface of the second ferrule into engagement with the concave frustoconical surface of the disc. The spring force urging the two frustoconical surfaces together along with the capability of lateral floating movement in the second ferrule produces a centering effect which causes the two ferrules to achieve axial alignment. This, in turn, results in axial alignment of the waveguides retained by the two sections of the connector.

BRIEF DESCRIPTION OF THE DRAWINGS

FIG. 1 is a perspective view of the optical waveguide connector of this invention;

FIG. 2 is a longitudinal sectional view of the connector, taken along line 2—2 of FIG. 1;

FIg. 3 is a view similar to FIG. 2, but with the connector sections separated;

FIG. 4 is an elevational view of the forward end of the plug of the connector;

FIG. 5 is an elevational view of the forward end of the receptacle of the connector;

FIG. 6 is an exploded perspective view of various components of the connector;

FIG. 7 is an enlarged fragmentary elevational view illustrating how the optical waveguides fit within the opening in the ferrule;

FIG. 8 is a perspective view of the collar of the receptacle; and

FIG. 9 is a fragmentary sectional view of the forward portion of the receptacle, taken along line 9-9 of FIG. 3.

DESCRIPTION OF THE PREFERRED EMBODIMENTS

The connector of this invention includes a plug 10 and a receptacle 11 which connect together bundles 12 and 13, respectively, of optical waveguides.

The plug 10 includes a tubular plug shell 14, the exterior of which includes a forward cylindrical portion 15 which, through a radial shoulder 16, connects to a short enlarged externally threaded portion 17. A second radial shoulder 18 is at the rearward end of the enlarged threaded portion 17, leading to a cylindrical portion 19 that is of larger diameter than that of the forward portion 15. Flats 20 are provided on opposite sides of the portion 19 of the plug shell 14. At the rearward end of the plug shell is an externally threaded portion 21, which is of smaller diameter than that of the portion 19 adjacent to it.

Internally, the plug shell includes a straight cylindrical bore 23, which extends from the rearward end 24 of the plug shell to a pair of opposed parallel flanges 26 at the forward end 27 of the plug shell. The flanges 26 are chordal with respect to the bore 23 and have flat inner transverse surfaces 28, spaced apart a lesser distance than the diameter of the bore 23. The forward end 27 of the plug shell 14 is recessed intermediate the flanges 26, providing a pair of diametrically opposed slots 29.

Extending inwardly from the rearward end of the plug shell 14, is a waveguide support 31, having a bore 32 through which passes the bundle of optical waveguides 12. Exteriorly, the support 31 includes a rearward portion 33 of relatively small diameter over which fits the protective jacket 34 of the waveguide bundle 12. The inner end of the jacket 34 engages a shoulder 35 of the support 31, spaced inwardly of which is an annular flange 36. The forward radial face 37 of the flange 36 engages the rearward end 24 of the plug shell 14. On its rearward side 38, the flange 36 is engaged by the flange 39 of a retainer nut 40 that meshes with the threads of the rearward end portion 21 of the plug shell 14. Forwardly of the flange 36, the support 31 includes a cylindrical exterior surface 42 which is substantially complementarily received in the bore 23 of the plug shell. A forwardly facing shoulder 43 connects the portion 42 of the support 31 to a forward cylindrical exterior surface 44 of smaller diameter than that of the surface 42.

Positioned ahead of the forward end 46 of the support 31 is a ferrule 47 which receives and supports the forward end of the bundle 12 of optical waveguides. The ferrule 47 has an enlarged rearward opening 48 which, through a tapered portion 49, leads to a restricted forward opening 50 of a configuration and size such that it will receive a predetermined number of the individual optical waveguides 51 of the bundle 12, positioning them at exact locations within the opening. In typical examples, the opening 50 may be triangular or it may be hexagonal as shown in FIG. 7. When of such shape with side walls of predetermined dimensions, the bundle of optical waveguides will be received in the opening 50 such that adjacent waveguides 51 are in contact with each other and the outermost waveguides 51 engage the walls of the openings. The waveguides 12 thus are complementary to the opening 50 and assume predetermined positions within the opening. The forward end of the bundle of waveguides 12 is made flush with the flat forward end surface 53 of the ferrule 47.

Exteriorly, the ferrule 47 includes a relatively large cylindrical rearward portion 54, an intermediate portion 55 that is cylindrical but of smaller diameter than the portion 54 and a frustoconical portion 56 connecting the portion 55 to the radial forward end 53. These surfaces are coaxial with the opening 50. Flats 58 extend rearwardly into the rearward cylindrical portion 54 to a position intermediate its length. Radial shoulders 59 interconnects the flats 58 and the cylindrical surface of the rearward portion 54.

The ferrule 47 is associated with the plug shell 14 so that its rearward portion 54 is in the bore 23 and the flats 58 are positioned between the flanges 26. The flats 58 cooperate with the inner surfaces 28 of the flanges 26 to prevent substantial rotation of the ferrule 47 relative to the plug shell 14. A compression spring 61 circumscribes the forward portion 44 of the support 31, bearing against the shoulder 43 of the support 31 and also against the rearward end 62 of the ferrule 47. This biases the ferrule 47 forwardly so that, when the connector is not mated, the shoulders 59 of the ferrule bear against the rearward faces 63 of the flanges 26 of the plug shell 14, which act as abutments to limit the forward movement of the ferrule.

Circumscribing the forward end portion 15 of the plug shell 14 is a sleeve 64, which has a pair of diametrically opposed forwardly extending lugs 65 on its forward end surface 66. A tapped opening 67 extends through the wall of the sleeve 64 and receives a set screw 68. Accordingly, by tightening the set screw 68 the sleeve 64 may be rotationally locked relative to the plug shell 14. Conversely, by loosening the set screw 68 the sleeve 64 may be rotated about the forward portion 15 of the plug shell 14.

The receptacle 11 includes a receptacle shell 70 having a forward exteriorly threaded portion 71, an intermediate and larger cylindrical knurled portion 72 and a rearward threaded portion 73. A cylindrical bore extends through the receptacle shell 70 including a principal portion 74 of constant diameter connecting to progressively enlarged short sections 75 and 76 at the forward end of the bore. This provides two radial shoulders 77 and 78 just inwardly of the forward end 79 of the receptacle shell 70. A transverse slot 80 is formed in the forward end of the receptacle shell having a depth such that its inner wall is between the two shoulders 77 and 78.

Within the bore 74 is a waveguide support 82, which is identical to the support 31, with the bundle of optical waveguides 13 extending through it. The jacket 83 for the waveguide bundle 13 receives the outer end of the support 82. A flange 84 on the support 82 is engaged by the flange 85 of a retainer nut 86 which holds the support 82 to the receptacle shell 70.

Forwardly of the support 82 is a ferrule 88 which has an opening with a rearward portion 89 and a tapered portion 90 similar to the portions 48 and 49 of the ferrule 47. The forward portion 91 of the opening through the ferrule 88 is identical in size and configuration to that of the opening 50 at the forward end of the ferrule 47 of the plug. Consequently, the forward ends of the individual waveguides 92 of the bundle 13 are supported by the ferrule 88 and assume predetermined positions within the opening 91, which positions correspond to those of the optical waveguides 51 within the opening 50 of the ferrule 47.

Exteriorly, the ferrule 88 has a cylindrical forward portion 93 of relatively small diameter connecting through a shoulder 94 to a cylindrical rearward portion 95 of larger diameter. Parallel flats 96 are formed at the forward end of the rearward portion 95, the flats 96 being spaced apart the same distance as the diameter of the forward section 93. The forward end surface 97 of the ferrule 88 is flat and in a radial plane, flush with the ends of the waveguides 92.

An alignment collar 98 at the forward end of the receptacle shell 70 has a cylindrical exterior with a forward portion 99 of relatively large diameter connecting through a radial shoulder 100 to an intermediate portion 101 of smaller diameter. The rearward portion 102 is of still smaller diameter and connects to the intermediate portion 101 through a radial shoulder 103. The portions 99, 101 and 102 of the collar 48 fit closely within the bore sections 76, 75 and 74, respectively, of the receptacle shell 70, with the shoulders 103 and 100 of the collar engaging the shoulders 77 and 78, respectively, of the receptacle shell. The collar 98 is bonded to the receptacle shell so as to be in effect integral with it.

A bore extends through the collar 98 and is coaxial with the exterior surfaces of the collar. The bore includes a forward entrance defined by a surface of revolution, i.e., a frustoconical portion 104. The latter surface is closely held dimensionally and has the same angle as that of the conical surface 56 at the forward end portion of the ferrule 47. At the inner narrow end of the frustoconical surface 104 is a cylindrical bore section 105. At the rearward end of the collar 98, a transverse slot 106 extends through the collar at the location of the rearward cylindrical exterior surface 102. The slot 106 provides opposed flat parallel surfaces 107, which are spaced apart a distance equal to the diameter of the cylindrical bore portion 105 of the collar 98.

As installed in the receptacle, the cylindrical bore portion 105 of the collar 98 complementarily receives the forward cylindrical portion 93 of the ferrule 88. The flat surfaces 96 of the ferrule 88 then are complementarily received between the flat surfaces 107 of the slot 106 in the collar 98. This precludes rotation of the ferrule 88 relative to the collar 98, but does not prevent axial movement of the ferrule relative to the collar.

A compression spring 108 circumscribes the forward portion 109 of the waveguide support 82 with one end of the spring bearing against the radial shoulder 110 of the waveguide support and the other spring end against the rearward end 111 of the ferrule 88. This biases the ferrule 88 forwardly with respect to the receptacle shell 70 so that, when the plug and receptacle are disconnected as shown in FIG. 3, the shoulder 94 of the ferrule bears against the shoulder 103 of the collar 98. In this position, the forward end 97 of the ferrule 88 is beyond the cylindrical bore 105 of the collar 98 and is at the forward end of the receptacle 11. The spring 108 of the receptacle is not as strong as the spring 61 that bears against the ferrule 47 of the plug 10.

The plug and receptacle are secured in the mated position by a coupling nut 113, which has an internally threaded portion 114 that meshes with the externally threaded portion 71 of the receptacle shell. The coupling nut 113 includes an unthreaded intermediate portion 115 and a rearward inwardly extending flange 116. The coupling nut 113 is associated with the plug 10 by threading it on and past the short exteriorly threaded portion 17 of the plug shell 14. In the mated position, the flange 116 of the coupling nut bears against the shoulder 18 of the plug shell, thereby cooperating with the threads 114 to hold the plug and receptacle together. The coupling nut 113 has a knurled exterior for easy hand rotation in mating the plug and receptacle.

As the plug 10 and receptacle 11 are moved toward the mated position, the forward end 53 of the ferrule 47 of the plug 10 is brought to bear against the forward end 97 of the ferrule 88 of the receptacle 11. Because the compression spring 61 of the plug is stronger than the compression spring 108 of the receptacle, the ferrule 88 of the receptacle is displaced rearwardly as the plug and receptacle are advanced toward each other. As this movement of the ferrule 88 takes place, it maintains its rotational position, being guided by the flat surfaces 96 of the ferrule 88 and 106 of the collar 98. Ultimately, the forward end 112 of the ferrule 88 is pushed into the bore 105 of the collar 98 and the convex conical surface 56 of the ferrule 47 encounters the concave conical surface 104 of the collar. Further movement of the plug and receptacle to the fully mated position causes the surface 104 of the collar 88 to displace the ferrule 47 rearwardly a short distance relative to the plug shell 14 as the forward end surface 27 of the plug shell is brought into abutment with the forward end 117 of the collar 98 of the receptacle (see FIG. 2). The ends of the fibers 12 and 13 are held in abutment at this time by the force of the spring 108.

Axial alignment of the ferrules 47 and 88 is accomplished by the interengagement of the conical surfaces 56 of the ferrule 47 and 104 of the collar 98. With these complementary surfaces pressed together by the differential spring force, the two parts are centered. The lateral floating movement permitted the ferrule 47 enables it to achieve precise axial alignment with the rigidly held collar 98. This, in turn, aligns the ferrule 47 with the ferrule 88 that is coaxial with the collar. The bundle of fibers 12 of the plug thereby becomes aligned with the bundle of fibers 13 of the receptacle. The alignment takes place automatically as the connector is mated.

Relative rotational adjustment of the bundles of waveguides 12 and 13 is accomplished by the sleeve 64 which may be turned relative to the plug shell 14. The lugs 65 of the sleeve 64, received in the slot 80 of the receptacle shell 70, turn the receptacle shell and hence its bundle of fibers 13 relative to the bundle 12 of the plug 10. Tightening of set screw 68 will retain this adjustment.

The arrangement for aligning the bundles of waveguides 12 and 13 is equally applicable to aligning single waveguides in an end-to-end relationship. In other words, each section of the connector may contain only a single optical waveguide rather than a bundle of waveguides. Again, precise end-to-end alignment is accomplished by the interengagement of the frustoconical surfaces.

The foregoing detailed description is to be clearly understood as given by way of illustration and example only, the spirit and scope of this invention being limited solely by the appended claims.

What is claimed is:

1. An optical waveguide connector comprising
   a first optical waveguide means having an end portion,
   a first support means for said end portion of said first optical waveguide means,
   said first support means including a convex surface of revolution coaxial with said first optical waveguide means,
   a second optical waveguide means having an end portion,
   a second support means for said end portion of said second optical waveguide means,
   said second support means including a concave surface of revolution coaxial with said second optical waveguide means,
   and means urging said first and second support means relatively toward each other for causing an interengagement of said convex and concave surfaces and thereby aligning said first and second waveguide means.

2. An optical waveguide connector comprising
   a first unit,
   a second unit,
   releasable means joining said first and second units,
   first optical waveguide means,
   second optical waveguide means,
   first support means carried by said first unit for supporting said first optical waveguide means in said first unit, second support means carried by said second unit for supporting said second optical waveguide means in said second unit,
   said first and second waveguide means being positioned by said first and second support means so as to have ends thereof in adjacency,
   one of said support means including a concave surface of revolution,
   the other of said support means including a convex surface of revolution,
   and resilient means for biasing said first and second support means together so that said concave surface is engaged by said convex surface,
   one of said support means being laterally movable with respect to the unit carrying the same, whereby said concave and convex frustoconical surfaces so engaged cause alignment of said first and second support means, and thereby cause alignment of said first and second waveguide means.

3. A device as recited in claim 2 in which said concave surface is a frustum of a cone, and said convex surface is a frustum of a cone.

4. A device as recited in claim 2 in which said laterally movable support means has said convex surface.

5. A device as recited in claim 4 in which the other of said support means is laterally fixed relative to the unit carrying the same.

6. A device as recited in claim 5 in which
said other support means includes a first member having an opening receiving said waveguide means,
and a second member having an opening receiving said first member,
said second member being integral with said unit carrying said one support means,
said first member being axially slidable relative to said second member.

7. A device as recited in claim 6 in which said resilient means includes
a first spring biasing said first member toward said one support means,
and a second spring biasing said one support means toward said first member,
said second spring being stronger than said first spring.

8. A device as recited in claim 7 including in addition means for rotationally adjusting the position of one of said support means relative to the other of said support means for thereby rotationally adjusting the relative positions of said ends of said first and second waveguide means.

9. An optical waveguide connector comprising
a first unit, said first unit including
a first shell having a forward end and a rearward end,
a first ferrule in said first shell,
said first ferrule having an opening therethrough,
a first optical waveguide means having an end portion complementarily received in said opening through said first ferrule whereby said first ferrule positions said end portion of said first waveguide means,
a first means in said first shell for permitting said first ferrule to move axially and laterally relative to said first shell,
said first means including a first abutment for engageable by said first ferrule for limiting such axial movement of said first ferrule forwardly relative to said first shell,
a compression spring in said first shell biasing said first ferrule forwardly relative to said first shell, to a normal position in which said first ferrule so engages said first abutment,
said first ferrule having a forward end portion having a flat transverse surface centrally thereof,
and a convex frustoconical surface diverging rearwardly from said flat surface,
said convex frustoconical surface being coaxial with said opening through said first ferrule, said first waveguide means extending to said first flat surface and being substantially flush therewith,
a second unit, said second unit including
a second shell having a forward and a rearward end,
a second ferrule in said second shell,
said second ferrule having an opening therethrough,
a second optical waveguide means having an end portion complementarily received in said opening through said second ferrule whereby said second ferrule positions said end portion of said second waveguide means, a second means in said second shell for permitting said second ferrule to move axially relative to said second shell while precluding substantial lateral movement of said second ferrule relative to said second shell,
said second means including a second abutment engageable by said second ferrule for limiting such axial movement of said second ferrule forwardly relative to said second shell,
a second compression spring in said second shell biasing said second ferrule forwardly relative to said second shell, to a normal position in which said second ferrule so engages said second abutment,
said second ferrule having a forward end portion having a second flat transverse surface,
said second waveguide means extending to said second surface and being substantially flush therewith,
and a fixed means on said second shell defining a concave frustoconical surface at said forward end of said second shell for engagement by said convex frustoconical surface,
said concave frustoconical surface being coaxial with said opening through said second ferrule, and being convergent inwardly toward the periphery of said second ferrule at a location rearwardly of said second flat transverse surface when said second ferrule is in said engagement with said second abutment,
said first and second units being movable toward each other to a mated position in which said first and second flat surfaces are in abutment,
said first compression spring being stronger than said second compression spring whereby said first ferrule displaces said second ferrule rearwardly when said first and second units are in said mated position and said convex surface is brought into engagement with said concave surface for thereby aligning said first and second waveguide means,
and releasable means for holding said first and second units in said mated position.

10. A device as recited in claim 9 in which said second means includes an opening complementarily receiving said second ferrule, said second means and said second opening having interengaging substantially flat surfaces for so preventing relative rotation of said second ferrule relative to said second means.

11. A device as recited in claim 9 in which said first support means includes means for preventing substantial rotation of said first waveguide means relative thereto, and said second support means includes means for preventing substantial rotation of said second waveguide means relative thereto.

* * * * *